US008351668B2

(12) United States Patent
Naini (10) Patent No.: US 8,351,668 B2
(45) Date of Patent: Jan. 8, 2013

(54) SYSTEM AND METHOD FOR AUTOMATED PARTICLE IMAGING ANALYSIS

(75) Inventor: Mehran Thomas Naini, Nibley, UT (US)

(73) Assignee: Utah State University, Logan, UT (US)

( * ) Notice: Subject to any disclaimer, the term of this patent is extended or adjusted under 35 U.S.C. 154(b) by 581 days.

(21) Appl. No.: 12/685,279

(22) Filed: Jan. 11, 2010

(65) Prior Publication Data

US 2011/0170786 A1     Jul. 14, 2011

(51) Int. Cl.
 *G06K 9/00* (2006.01)
(52) U.S. Cl. ............................................... 382/128
(58) Field of Classification Search .......... 382/133–134, 382/128–103
 See application file for complete search history.

(56) References Cited

U.S. PATENT DOCUMENTS

| 5,390,259 | A  | * | 2/1995 | Withgott et al. | 382/173 |
| 6,282,304 | B1 | * | 8/2001 | Novikov et al.  | 382/125 |
| 8,090,173 | B2 | * | 1/2012 | Park            | 382/128 |
| 8,165,385 | B2 | * | 4/2012 | Reeves et al.   | 382/154 |
| 2003/0219146 | A1 | * | 11/2003 | Jepson et al. | 382/103 |
| 2010/0111396 | A1 | * | 5/2010 | Boucheron     | 382/133 |

* cited by examiner

*Primary Examiner* — Gerald J. O'Connor
*Assistant Examiner* — Edward Winston, III (57) ABSTRACT

Disclosed herein are systems and methods for automatically identifying and characterizing particles within an image. In particular, the systems and methods disclosed herein may be utilized to identify particles that overlap or form agglomerations of particles. Agglomerates may be identified using a variety of techniques. Perimeters of individual particles within an agglomerate may be estimated. According to several embodiments, objects may be characterized using a variety of characteristics, including the particle size, shape, Stokes diameter, aerodynamic diameter, convexity, circularity, and the like. In some instances, these characteristics may allow additional information to be calculated or determined, such as the composition of a particle. These characteristics may also be utilized to determine physical properties of particles, such as flowability, abrasive efficiency, bioactivity, solubility, catalytic activity, and other properties.

29 Claims, 10 Drawing Sheets

1. Left: Leaf      Right: Complex
2. Left: Leaf      Right: Leaf
3. Left: Complex   Right: Leaf
4. Left: Complex   Right: Leaf
5. Left: Leaf      Right: Leaf
6. Left: Complex   Right: Complex
7. Left: Leaf      Right: Leaf
8. Left: Complex   Right: leaf

| | | Bin Max | Diameters (um) | Bin | Frequency | Cumulative % | dN/d(ln(D)) |
|---|---|---|---|---|---|---|---|
| Avg | 6.1 | 0.2 | 0.1 | 0.2 | 0 | 0.0% | |
| Std Dev | 7.2 | 0.5 | 0.35 | 0.5 | 63 | 10.0% | 68.8 |
| Count | 629 | 1 | 0.75 | 1 | 87 | 23.8% | 125.5 |
| Max | 59.3 | 2.5 | 1.75 | 2.5 | 136 | 45.8% | 150.6 |
| Min | 0.3 | 5 | 3.75 | 5 | 99 | 61.5% | 142.8 |
| | | 10 | 7.5 | 10 | 97 | 76.9% | 139.9 |
| | | 20 | 15 | 20 | 114 | 95.1% | 164.5 |
| | | 30 | 25 | 30 | 23 | 98.7% | 56.7 |
| | | 40 | 35 | 40 | 5 | 99.5% | 17.4 |
| | | 50 | 45 | 50 | 2 | 99.8% | 9 |
| | | 60 | 55 | 60 | 1 | 100.0% | 5.5 |
| | | | | | | 100.0% | |
| | | | | More | 0 | | |
| | | | | Sum | 629 | | |

SYSTEM AND METHOD FOR AUTOMATED PARTICLE IMAGING ANALYSIS

TECHNICAL FIELD

This disclosure relates to a system and method for automatically characterizing objects within an image. More particularly, this disclosure relates to a system and method for distinguishing and characterizing individual particles, including particles within agglomeration of particles.

DETAILED DESCRIPTION

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, components, materials, or operations may not be shown or described in detail in order to avoid obscuring aspects of the disclosure. Furthermore, the described features, structures, or characteristics may be combined in any suitable manner in one or more alternative embodiments.

Particle characterization by imaging techniques and analytical methods is employed in diverse fields such as pharmaceuticals, health and medicine, environmental and pollution, and industrial manufacturing. The particle size, the particle size distribution, and the particle shape are factors that influence the chemical and physical behavior of microscopic particles. These factors may influence flowability, abrasive efficiency, bioactivity, solubility, catalytic activity, and other properties.

Pharmaceutical manufacturing processes may require control of particle characteristics in order to provide optimal therapeutic value. The particle size, the particle size distribution, and the particle shape of active ingredients and excipients are important physical characteristics of the materials used to create pharmaceutical products. These characteristics can affect bulk properties, product performance, processability, stability, and appearance of the end product. The manufacturing process determines the particle characteristics of size, size distribution, and shape. Dry powder inhalants, for example, may require particle size distributions in the 2 to 20 micron range. In the case of inhalation products, larger particles will impact on the back of the throat where there is no therapeutic benefit and smaller particles will be exhaled with the patient's next breath.

Knowledge of the characteristics of particles suspended in the air may also aid in the understanding of air pollution and the development of methods to reduce the detrimental effects of airborne pollutants. The range of particle sizes of concern for air emission evaluation is commonly divided into four standard categories, which are listed below.

| | |
|---|---|
| Supercoarse | diameter > 10 microns |
| Coarse, or $PM_{10}$ | 2.5 µm < diameter ≤ 10 µm |
| Fine, or $PM_{2.5}$ | 0.1 µm < diameter ≤ 2.5 µm |
| Ultrafine | diameter ≤ 0.1 µm |

$PM_{10}$ is particulate matter with an aerodynamic diameter of up to 10 µm. This includes the ultrafine, fine, and coarse categories. $PM_{10}$ is regulated as a specific type of pollutant because particles in this size range can travel through the air passages deep within the lungs where they may be deposited and result in adverse health effects, i.e. particles less than approximately 10 micrometers can penetrate into the lower respiratory tract and cause health problems. The particle size range between 0.1 and 10 micrometers is especially important in air pollution studies because a major fraction of the particulate matter generated in industrial processes is within this size range.

$PM_{2.5}$ defines particulate matter with an aerodynamic diameter of up to 2.5 µm. Particles in this size range settle very slowly in the atmosphere compared to coarse and supercoarse particles. Weather conditions and air circulation patterns can keep $PM_{2.5}$ particles airborne for up to several days, thus providing a means for these particles to travel several hundred miles. $PM_{2.5}$ particles can cause health problems due to their potentially long airborne retention time and the inability of the human respiratory system to defend itself against particles of this size. The chemical composition of $PM_{2.5}$ particles is generally different from that of coarse and supercoarse particles. $PM_{2.5}$ particles have a greater tendency to be composed of sulfates, nitrates, organic compounds, and ammonium compounds. In addition, these particles often contain acidic materials, metals and other contaminants associated with adverse health effects.

Three shape factors commonly used to characterize particles are circularity, convexity, and elongation. Circularity measures how near a shape is to a circle. Circularity is the ratio of the perimeter of a circle with the same area as the particle being measured, divided by the perimeter of the actual particle image. A perfect circle has a circularity of one, in contrast to an irregular object which has a circularity value near zero. Circularity is a function of the overall form of a particle in conjunction with its surface roughness.

Convexity is a measure of the surface roughness of a particle. It takes into account the peaks and valleys, or asperities, on the surface of particles. Convexity is calculated by dividing the smoothed surface perimeter by the actual uneven perimeter of the particle. A smooth shape, without surface asperities, has a convexity of one because the smooth surface perimeter is the same as the actual perimeter of the particle. An irregular particle shape, with many relatively large peaks and valleys has a convexity value near zero because the actual perimeter is much greater than the smoothed surface perimeter. Convexity is not affected by the overall shape of the particle, thus an elongated particle can have the same convexity as a spherical particle if the asperities on the surface of both particles are the same.

Elongation is defined as one minus the aspect ratio, where the aspect ratio is the width divided by the length. Elongation characterizes the slenderness of a particle. A shape symmetrical in all axes, such as a square or circle has an elongation value of zero. Shapes with large aspect ratios have an elongation value near one. The elongation value is not dependent on the surface roughness of the particle.

Image analysis is a method that is well suited to analyzing particle sizes and determining particle shapes because it generates information by directly capturing images of each particle. In certain applications, particles may be viewed through an optical microscope and recorded by a high-resolution camera. In other applications, images of larger areas (e.g., satellite imagery, or an image of a manufactured product) may also be analyzed. The resulting image may be analyzed by image analysis software. The software may provide a characterization of the particle size, particle shape, particle count, and other characteristics.

The systems and methods disclosed herein may be utilized in a wide variety of applications. For example, in one application the systems and methods disclosed herein may be utilized for the analysis of biological cells, such as bacteria, cancer cells, blood, and the like. In particular, the systems and methods disclosed herein may be utilized to obtain counts of various types of cells, and to determine various characteristics of the cells.

In addition to being employed to analyze relatively small particles, such as biological cells, the principles of the present disclosure are also scalable, and may allow for the analysis of larger objects utilizing similar principles. For example, in one application, a system according to the present disclosure may be utilized to analyze satellite imagery, and may be configured to detect various objects, such as people, automobiles, or airplanes within an image. In another application, the systems and methods disclosed herein may be utilized to perform quality control of manufactured goods.

Disclosed herein are systems and methods for automatically identifying and characterizing particles within an image. In particular, the systems and methods disclosed herein may be utilized to identify particles that overlap or form agglomerations of particles. Agglomerates may be identified using a variety of techniques. Perimeters of individual particles within an agglomerate may be estimated. According to several embodiments, objects may be characterized using a variety of characteristics, including the particle size, shape, Stokes diameter, aerodynamic diameter, convexity, circularity, and the like. In some instances, these characteristics may allow additional information to be calculated or determined, such as the composition of a particle. These characteristics may also be utilized to determine physical properties of particles, such as flowability, abrasive efficiency, bioactivity, solubility, catalytic activity, and other properties.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "connected to," and "in communication with" refer to any form of interaction between two or more entities, including mechanical, electrical, magnetic, and electromagnetic interaction. Two components may be connected to each other even though they are not in direct contact with each other and even though there may be intermediary devices between the two components.

The term agglomerate, as used herein, includes any combination of particles or objects in direct contact, bound or loosely joined together, overlapping and/or appearing to be in contact. For example, particles overlapping in an image, but not necessarily in contact create an agglomerate. Furthermore, an agglomerate may include any object or particle comprising two or more individual particles or objects.

Much of the infrastructure that can be used with embodiments disclosed herein is already available, such as: general purpose computers; computer programming tools and techniques; and digital storage media. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer readable storage medium Aspects of certain embodiments described herein are illustrated as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules described herein tangibly embody a program, functions; and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools.

Furthermore, the described features, operations, or characteristics may be combined in any suitable manner in one or more embodiments. It will also be readily understood that the order of the steps or actions of the methods described in connection with the embodiments disclosed herein may be changed as would be apparent to those skilled in the art. Thus, any order in the drawings or detailed description is for illustrative purposes only and is not meant to imply a required order, unless specified to require an order.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

Figure 1A:
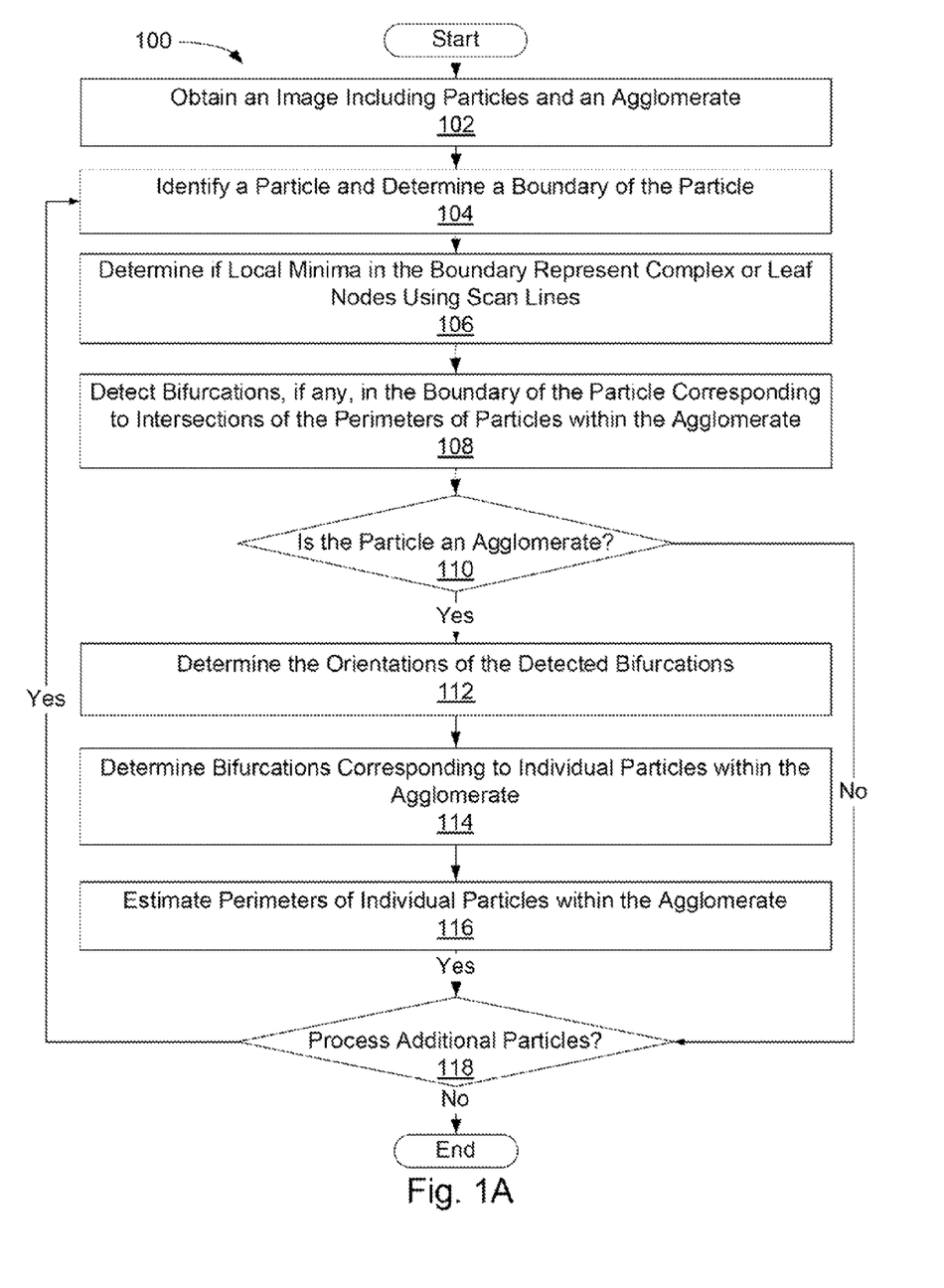
FIG. 1A is a flow chart illustrating one embodiment of a method of processing an image and identifying particles and an agglomerate in the image.

FIG. 1A illustrates an exemplary method 100 for analyzing an image containing a plurality of particles, with or without one or more agglomerations of individual particles. Method 100 obtains an image which may include agglomerates 102. In certain embodiments, a photographic and/or a micro-photographic camera may be used to obtain an image in conjunction with the present system and method. In other embodiments, method 100 may be utilized to analyze an existing image.

A variety of types of images may be processed using method 100. According to one embodiment an image is generated using bright-field and/or dark-field microscopic imagery techniques. In still other embodiments, an image of a plurality of particles is obtained using a Red, Green, and Blue (RGB) optical image generator, such as a charged coupled device (CCD) or CMOS imager. Accordingly, the image obtained may be a matrix or other arrangement of indexed red, green, and blue pixels. The ratio of red, green, and blue pixels may be adjusted as desired for a particular application or imaging device. According to several embodiments, the contrast, brightness, saturation, intensity, and/or other characteristics of the image may be manipulated to intensify the contrast between an agglomerate and a background of the image.

A variety of representations and types of images may be used, such as a Hue, Saturation, and Value (HSV), Hue, Saturation, and Light (HSL), Hue, Saturation, and Intensity (HIS) and/or Hue, Saturation, and Brightness (HSB). One or more of the components (i.e. the Hue, Saturation, or Value components) of the HSV representation may be manipulated to intensify the contrast of an agglomerate with respect to a background of an image. Manipulation of these components may allow for more accurate detection of a boundary of an agglomerate. Specifically, the conversion from RGB to HSV may be done so as to emulate the human eye and accurately preserve the color transition between two particles that are attached or joined together. Multiple representations of an image, such as RGB and HSV, and multiple types of manipulations may also be used in combination. Images may also be converted between various representations (i.e., an RGB image may be converted to HSL or HSV, and vice versa).

Additionally, various alternative color spaces may be used to highlight transitions between two particles in an image, including the RGB, CMY, CMYK, YIQ, YUV, HSV, and HSL color spaces. Furthermore, it may be useful to utilize the CIELAB and CIEXYZ color spaces to define color differences between particles in an image. According to various embodiments, color spaces beyond those of the human eye may be used to distinguish particles from one another. For instance, it may be possible to distinguish one particle from another using infrared or ultraviolet illumination.

In addition to differentiating between particles using color, more complex systems may also analyze the texture of the objects, gradient of color from a center that is more saturated to an area of lower saturation close to an edge, and other differentiating characteristics. According to various embodiments, the characteristics analyzed may be user-defined for a specific application. For example, a system may be configured to specifically detect how many sulfur particles are present by using parameters that distinguish sulfur from other particles.

Once an image has been obtained 102, method 100 identifies a particle and determines a boundary of the particle 104. According to various embodiments, various characteristics of the image may be manipulated to accurately identify particles and a boundary of the identified particles. According to one embodiment a black and white representation of the image may be used. Particles may be represented as white pixels and the background with black pixels, or vice versa. Such a representation lends itself to detection of the boundaries or edges of individual particles.

After identifying a particle 104, method 100 may utilize scan lines 106 to detect local minima in the boundary of an agglomerate. Each local minimum can be classified as having complex or leaf nodes 106 to its left and right. After determining a complexity for the particle 106, method 100 detects bifurcations, if any, in the perimeter of the agglomerate corresponding to intersections of the perimeters of particles within the agglomerate 108. As used herein, the term bifurcation refers to a location on the perimeter of an agglomerate where the perimeters of two or more particles of the agglomerate intersect. If bifurcations are not detected 110 in an identified particle, method 100 may proceed to step 118. According to one embodiment, method 100 detects a bifurcation by locating local minima on the perimeter of the agglomerate. In certain embodiments, an approximate radius of curvature may be calculated for each of the detected local minima. Thresholds may be set and compared to the approximate radius of curvature for each detected local minima. The threshold may be chosen so as to distinguish bifurcations from mere irregularities in the perimeter of a particle. The presence of bifurcations may indicate that a particle under analysis is an agglomerate comprising two or more individual particles.

At step 110, method 100 determines whether a particle being analyzed is an agglomerate. One mechanism for making this determination is based on whether bifurcations are detected in the boundary of a particle 108. Other factors may also be considered in determining whether a particle is an agglomerate. For example, agglomerates tend to exhibit a lower circularity value when a sample primarily comprises spherical particles. Other characteristics, such as convexity and elongation, may also be analyzed when determining whether a particle is an agglomerate 110.

If a particle is determined to be an agglomerate in step 110, the orientations of detected bifurcations are determined in step 112. As will be discussed in greater detail in connection with an embodiment illustrated in FIG. 3A, the orientations assigned to each bifurcation may correspond to compass directions. For example, a portion of the perimeter adjacent to a local minimum is classified as north, north-east, east, south-east, south, south-west, west, or north-west.

Method 100 may then determine which bifurcations are associated with individual particles within the agglomerate 114. According to one embodiment, method 100 may compare the detected bifurcations in the boundary of the agglomerate with the perimeters of the individual particles, which may be detected by other techniques, such as a watershed transformation, to determine perimeters for each of the individual particles within the agglomerate.

Method 100 may estimate a perimeter of individual particles within the agglomerate. According to one embodiment, adjacent bifurcations are connected to determine a perimeter of a particle 116. According to some embodiments, a straight line connecting two bifurcations is used to estimate a portion of the perimeter. Alternatively, method 100 may use a curved line or an approximation based on the curvature of other portions of the perimeter of a particle to estimate perimeter. In some embodiments, an estimation of the perimeter of a particle may be based on one or more edge detection methods, such as a watershed transformation, an abrupt color change in the image, analysis of shadows in the image, and the like.

After estimating perimeters of individual particles, method 100 may determine whether to process additional particles 118 in the image. If additional particles require processing, method 100 may return to step 104. If no additional particles require processing, method 100 may end. A system for implementing method 100 may include a computer containing a processor and a memory, such as the computer illustrated in FIG. 4.

Figure 1B:
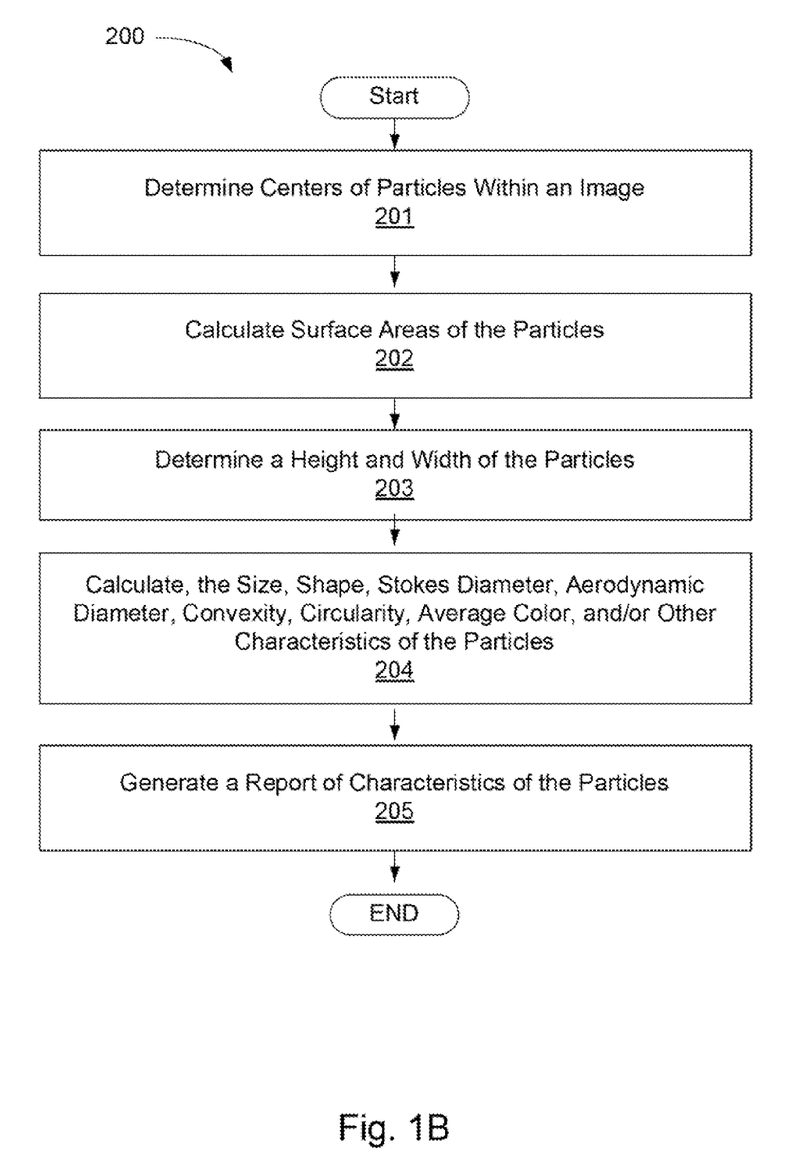
FIG. 1B is a flow chart illustrating one embodiment of a method of characterizing particles in an image.

FIG. 1B illustrates one exemplary method for characterizing particles, including agglomerated particles, in an image. Method 200 may be employed in connection with method 100, illustrated in FIG. 1A, or may be employed in connection with other systems and methods of particle imaging analysis. Method 200 may determine a center of a particle within an image 201. If the estimated perimeter resembles that of a common shape, the commonly accepted center of the shape may be used. However, according to one embodiment, the shape of the perimeter is approximated as an n-sided polygon. Depending on the accuracy needed, the number n may be as large as computationally feasible. By approximating the perimeter of the particle as an n-sided polygon, equations known in the art may be used to find an approximate center of the particle.

Method 200 may calculate surface areas of the particles within the image 202. According to one embodiment, a particle's surface area is calculated by determining the number of pixels within the perimeter of the particle. Each pixel represents a fixed area; by multiplying the number of pixels within the perimeter by the area-per-pixel. Additionally, a width and a height may be calculated for each particle 203. The calculated widths and heights may be averages, maximums, or weighted averages based on distance from the center of the particle determined in step 201. Additional characteristics including a size, shape, Stokes diameter, aerodynamic diameter, convexity, circularity, average color, and/or other characteristics of a particle may be determined 204.

In one embodiment, an average color may be determined for each particle. For each particle the RGB values of the 8 surrounding pixels surrounding a pixel at an approximate center of a particle are averaged. This average (RGB) is then converted to HSV plane. The hue component of this average is taken as the hue of a particle. The area associated with the pixels may then be converted into the HSV plane, so that the total area of color pixels, can be compared to the average (RGB) that was converted to emulate the human eye and accurately preserve the color transition between two particles. For example, according to one embodiment, specific parameters may be utilized to emulate the human eye using any number of representative color spaces. In an alternative embodiment 25 pixels (or other adequate number) may be averaged in place of 9 pixels.

The information determined by method 200 may be compiled, and a report may be generated 205 based on the identified characteristics. Method 200 may generate the calculated and measured information in any number of reports, statistical reports, or graphical representations 205. According to one exemplary embodiment, a histogram is generated illustrating the number of particles corresponding to a particular characteristic and specified over a range. For example, a histogram may include the number of particles in each of six different size categories, or the number of particles in each of five different Stokes diameter ranges.

Figure 2A:
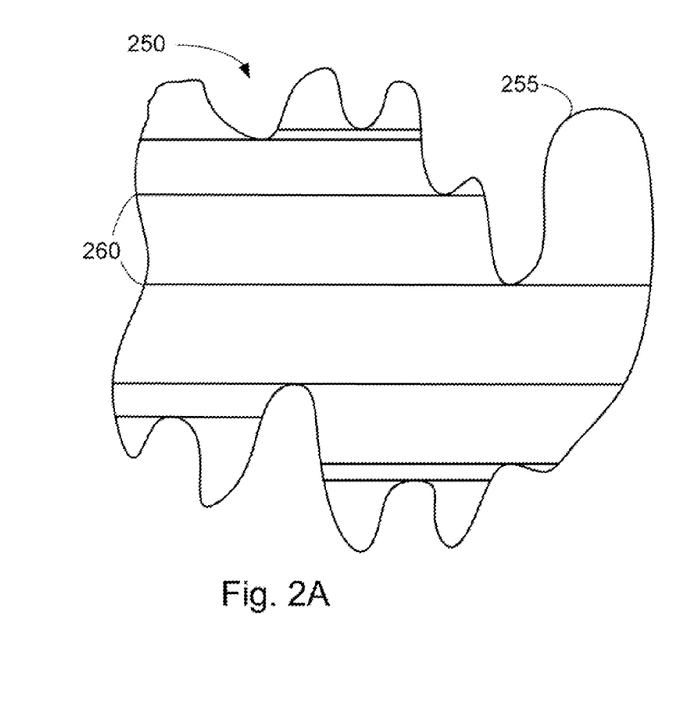
FIG. 2A illustrates scan lines being used to identify potential bifurcations and determine a complexity value of an agglomerate, according to one exemplary embodiment.
Figure 2B:
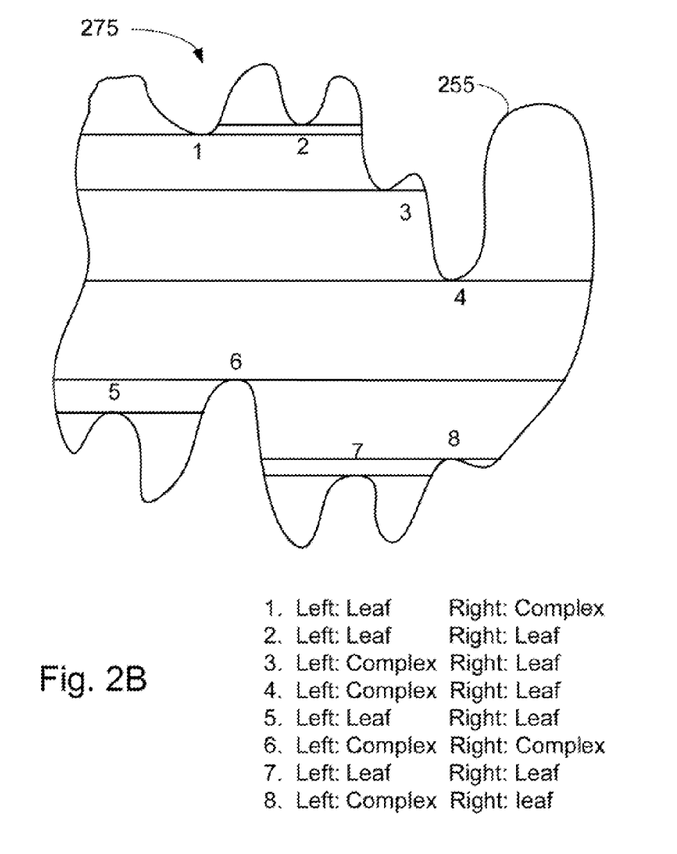
FIG. 2B illustrates an assignment of a complexity value of potential bifurcations of the agglomerate of FIG. 2A, according to one exemplary embodiment.

FIGS. 2A and 2B are used to demonstrate step 106 for determining agglomerates. FIG. 2A illustrates an exemplary agglomerate 250 with a defined perimeter 255. A plurality of scan lines 260 are used to identify and classify local minima in the perimeter 255. As illustrated, there are eight horizontal scan lines 260 corresponding to the various local minima in the perimeter 255 of the agglomerate 250. According to various embodiments, scan lines may be used to identify potential bifurcations corresponding to bifurcations in the perimeter 255. A local minimum may be classified and considered a potential bifurcation if the transition on the perimeter is sufficiently abrupt, such as where the radius of curvature is sufficiently short, the directional transitions before and after the minimum are sufficiently different, and/or other differentiating characteristics are present. One differentiating characteristic may include the use of color or shadow transition as described above. According to the illustrated embodiment horizontal scan lines are utilized; however, according to alternative embodiments, vertical scan lines and even scan lines of varying angles may be utilized. Alternatively, horizontal scan lines may be used while the image is rotated relative to fixed scan lines in order to achieve a similar result.

As illustrated in FIG. 2B, according to one embodiment, after local minima are identified they are classified according to complexity. Thus, local minima 1-8 are illustrated in FIG. 2B and are classified as detailed below the illustration. Classifications may include a minima being either a leaf or complex in a specific direction, where complex indicates that multiple leafs may be present. For example, minimum 1 is classified as a leaf to the left and complex to the right, indicating that to the left of minimum 1 there is only one leaf and that to the right of minimum 1 there are multiple leaves. According to one embodiment, a method for determining complexity includes analyzing the scan line tangent to the minimum and determining if, in a given direction (e.g. left or right), the tangential scan line intercepts the perimeter 255 prior to encountering an additional local minimum in the perpendicular direction closest to the perimeter. The following examples are useful to clarify the classification process.

Returning to our example of minimum 1, to the left of the minimum the tangential scan line intercepts the perimeter 255 with no other local minima above it. However, to the right of minimum 1 the tangential scan line intercepts the perimeter 255 only after having passed below minimum 2. Thus, to the right of minimum 1 is complex, while to the left is a leaf.

As another example, minimum 6 is classified as complex to the left and the right. The scan line tangent to minimum 6 intercepts the perimeter 255 only after passing above minimum 5 to the left and minima 7 and 8 to the right. As a final example, minimum 5 is classified as a leaf to the right and the left as the scan line tangent to the minimum intercepts the perimeter 255 without passing above any other local minima. According to various embodiments, minima present on a sidewall of a perimeter may be classified in the up and down directions rather than the left and right.

Figure 3A:
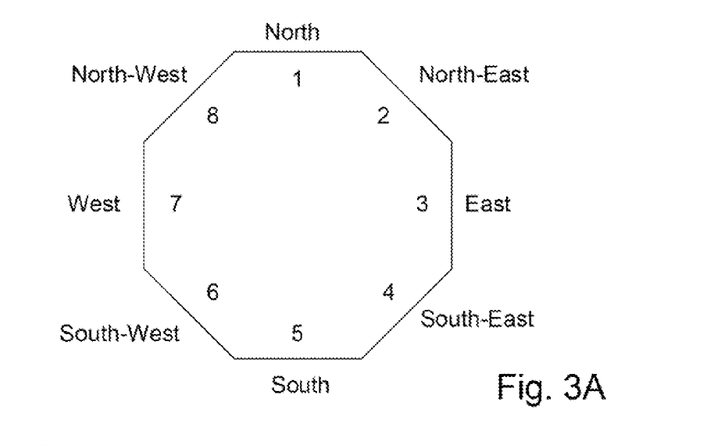
FIG. 3A illustrates an exemplary association of relative orientations and numbers that may be used in determining orientations of bifurcations, according to one embodiment.
Figure 3B:
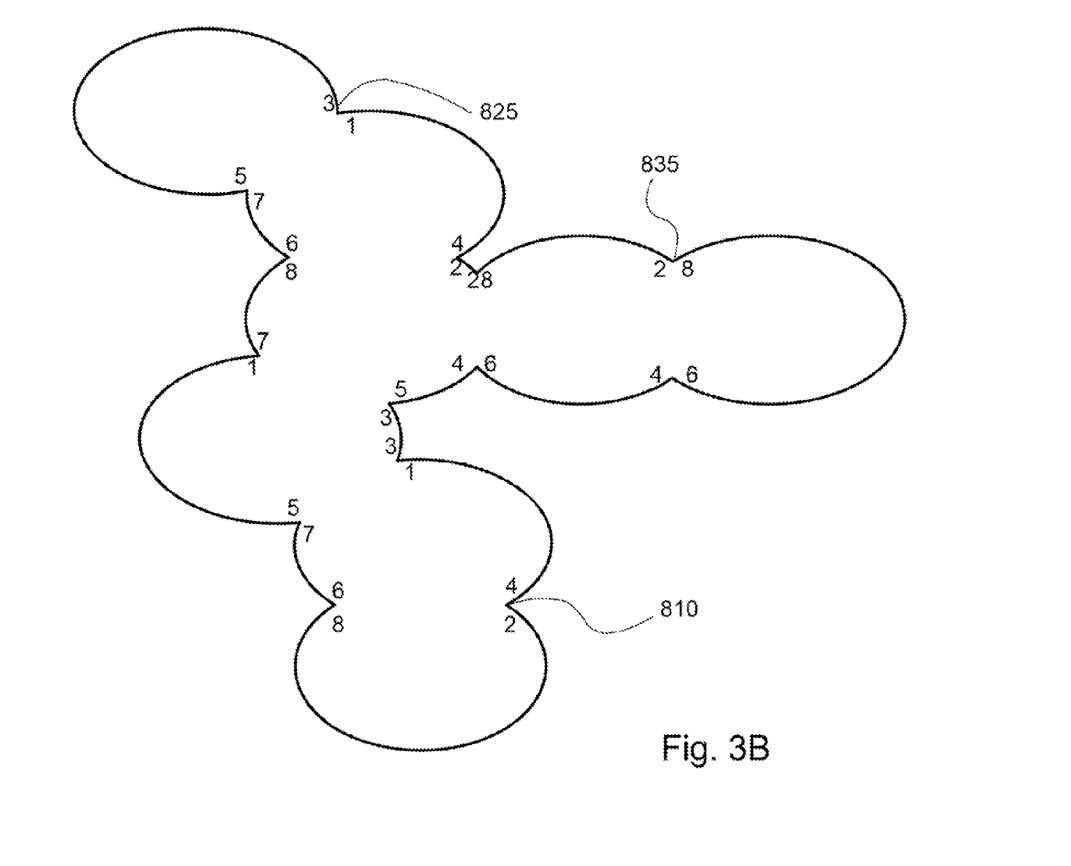
FIG. 3B illustrates an exemplary agglomerate, in which the orientation of each bifurcation is labeled using the relative orientations illustrated in FIG. 3A.

FIGS. 3A and 3B demonstrate concepts used in step 108 to identify particles within agglomerates. FIG. 3A illustrates an exemplary convention for determining an orientation of bifurcations detected in the boundary of an agglomerate. According to the illustrated embodiment, each particle within an agglomerate is represented as an octagon (i.e., an eight-sided polygon). The octagon is labeled with compass directions north, north-east, east, south-east, south, south-west, west, and north-west, each of which is assigned a numerical value. For example, north=1, south=5, north-west=8. Other shapes may also be used, including but not limited to decagons, hexagons, pentagons, squares, etc.

FIG. 3B illustrates an example of the convention of FIG. 3A as applied to agglomeration of particles. Each bifurcation is labeled with a number pair comprising a first integer and a second integer. The first integer may correspond to the integer representation of a location on the first polygon of the bifurcation, and the second integer may correspond to the integer representation of a location on the second polygon of the bifurcation. The number pair represents an orientation for a specific bifurcation. For example, bifurcation 825 is labeled with a 3 and a 1. Thus, the bifurcations orientation is 31. The portion of the perimeter immediately adjacent to the bifurcation 825 on the left side corresponds to the portion of the octagon labeled east, or with a 3. Consequently, the left side of bifurcation 825 is labeled with a 3. The orientation of the portion of the perimeter immediately adjacent to the bifurcation 825 on the right side corresponds to the portion of the octagon labeled with north, or with a 1. Thus, the right side of bifurcation 825 is labeled with a 1. Bifurcation 825 may therefore be said to have an orientation of 31. Likewise, bifurcation 835 is labeled as a 28 because the orientation of the portion of the perimeter to the left of the bifurcation 835 corresponds to the 2 on the octagon and the orientation of the portion of the perimeter to the right of the bifurcation corresponds to the 8 on the octagon.

In certain embodiments, the orientations of the bifurcations may be one characteristic of an agglomerate that may be determined. By representing the orientation of a bifurcation using integers, the computational load associated with processing and analyzing the orientation information may be reduced. For example, a computer may perform simple tests involving integer comparisons to determine which edge of a first particle is associated with which edge of a second particle. Similarly information about multiple particles may be grouped, sorted, or searched, using the integer representations.

Figure 4:
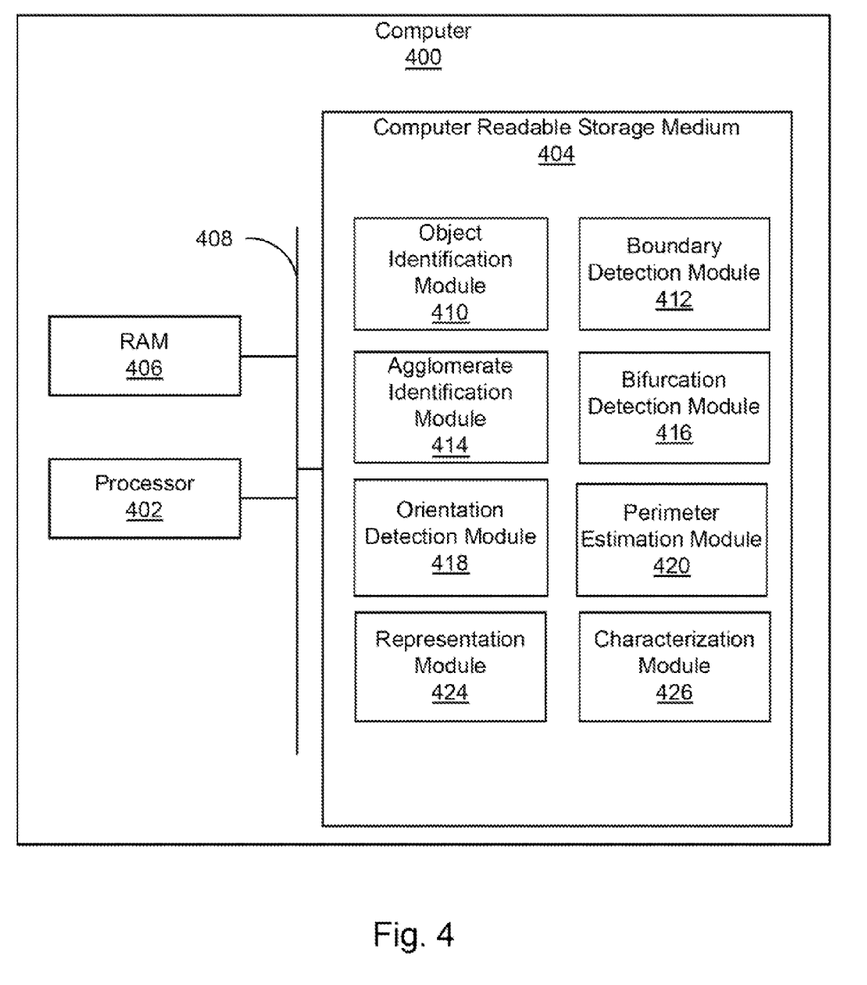
FIG. 4 is a functional block diagram of a computer system configured to process an image and identify particles and an agglomerate in the image.

FIG. 4 illustrates one possible implementation of a system that may be utilized to implement the methods of FIGS. 1 and 2, and/or utilized to determine the orientation of bifurcations using the convention illustrated in FIG. 3A. A computer 400 includes a processor 402, a computer readable storage medium 404, Random Access Memory (RAM) 406, and a bus 408. Bus 408 provides a connection between RAM 406, processor 402, and computer readable storage medium 404. Processor 402 may be embodied as a general purpose processor, an application specific processor, a microcontroller, a digital signal processor, or other device known in the art. Processor 402 performs logical and arithmetic operations based on program code stored within computer readable storage medium 404.

Computer readable storage medium 404 may comprise various modules for analyzing an image and detecting a plurality of objects within the image. Such modules may include an object identification module 410, a boundary detection module 412, an agglomerate identification module 414, a bifurcation detection module 416, an orientation detection module 418, a perimeter estimation module 420, a representation module 424, and a characterization module 426. Each module may perform one or more tasks associated with the analysis of an image. One of skill in the art will recognize that certain embodiments may utilize more or fewer modules than are shown in FIG. 4.

In various embodiments, the modules illustrated in FIG. 4 may be configured to implement the steps of method 100, illustrated in FIG. 1, and method 200, illustrated in FIG. 2, and other techniques and processes described herein. For example, object identification module 410 may be configured to identify a plurality of objects in an image using a variety of techniques. Boundary detection module 412 may be configured to detect a boundary of an object identified by object identification module 410. Agglomerate identification module 414, may be configured to determine that an object identified by object identification module 410 comprises an agglomerate. Bifurcation detection module 416 may be configured to detect a bifurcation on the boundary of the agglomerate. The bifurcation corresponds to an intersection of a perimeter of the first object with a perimeter of the second object. An orientation of each detected bifurcation may be determined by orientation detection module 418. The results of bifurcation module 416 and orientation module 418 may be utilized by perimeter estimation module 420 to determine an estimated perimeter of each particle within an agglomerate. Characterization module 426 may consolidate information from the various modules, and may generate additional information about the plurality of particles in the image, including an estimated center, an estimated height, an estimated width a size value, a shape value, a Stokes diameter value, an aerodynamic diameter value, a convexity value, and/or a circularity value. Representation module 424 may incorporate any of the characteristics determined by characterization module 426 into a representation, such as a graph, histogram, or other format.

Figure 5:
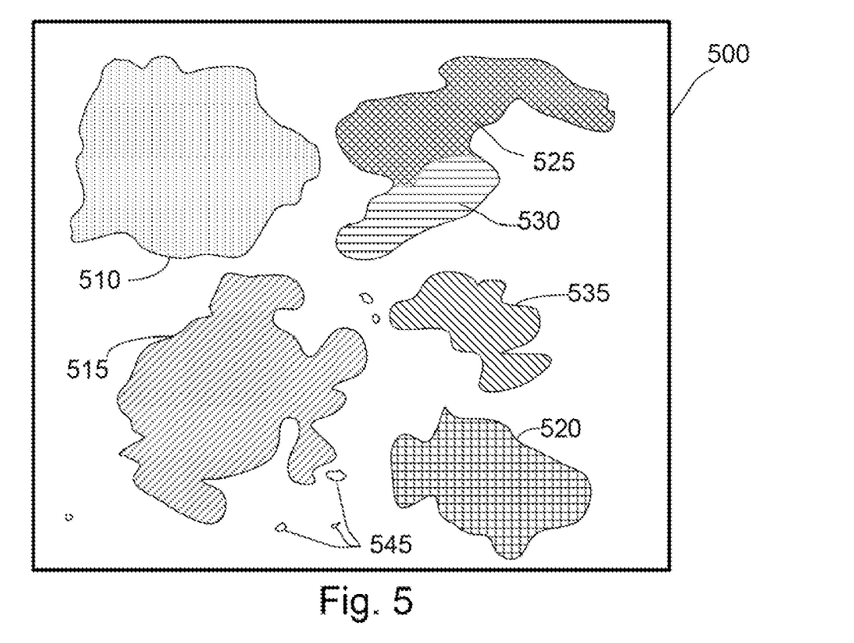
FIG. 5 illustrates an image of particles to be analyzed, some of which are agglomerated, according to one exemplary embodiment.

FIG. 5 illustrates an exemplary image 500 to be processed. As illustrated, image 500 includes agglomerates 515, 520, 525, 530 and 535 as well as individual particles 510 and 545. Additionally, the image may include particles of various sizes. For example particle 510 is relatively large, while particles 545 are relatively small. In FIG. 5, the different line patterns may represent some visual distinction between particles, such as color, texture, or convexity. Image 500 may include agglomerates of multiple particles that are similar in color and/or texture 515, 520, 535. In contrast, some agglomerates, such as agglomerates 525 and 530, are visually or texturally distinct.

Figure 6:
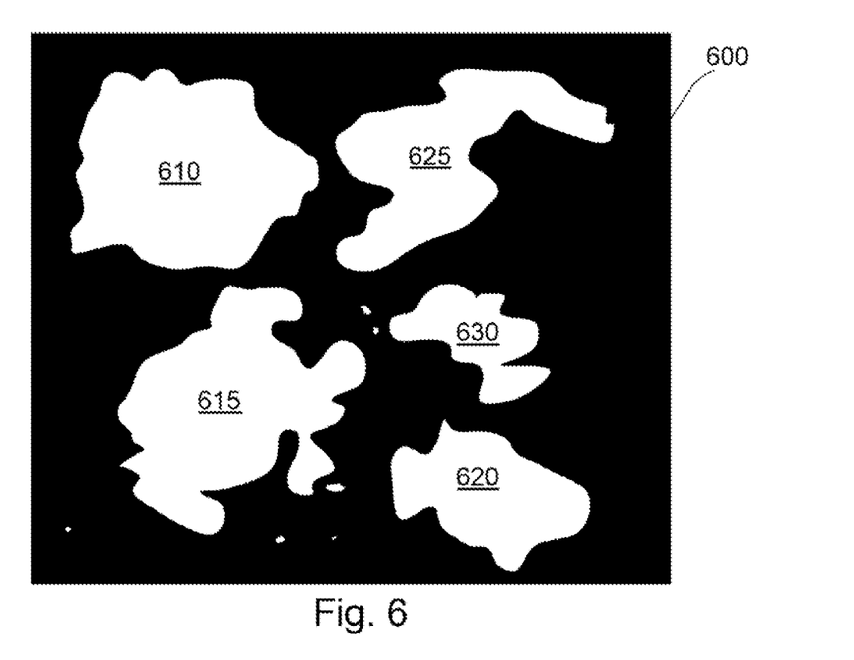
FIG. 6 illustrates an image of particles, some of which are agglomerated, with an outer perimeter of the agglomerate in contrast with a background of the image, according to one exemplary embodiment.

One technique that may be used in estimating a boundary of each particle within an image is to represent the image in black and white, as illustrated in FIG. 6. A variety of techniques may be utilized for converting an image to a black and white representation, or other form of representation. For example, adaptive thresholds may be utilized. According to various embodiments, the conversion of image 500 of FIG. 5 to image 600 of FIG. 6 may also include conversion from one image representation to another, such as RGB to HSV, and/or an adjustment of contrast, brightness, saturation, intensity, and/or other characteristic of an image.

Figure 7:
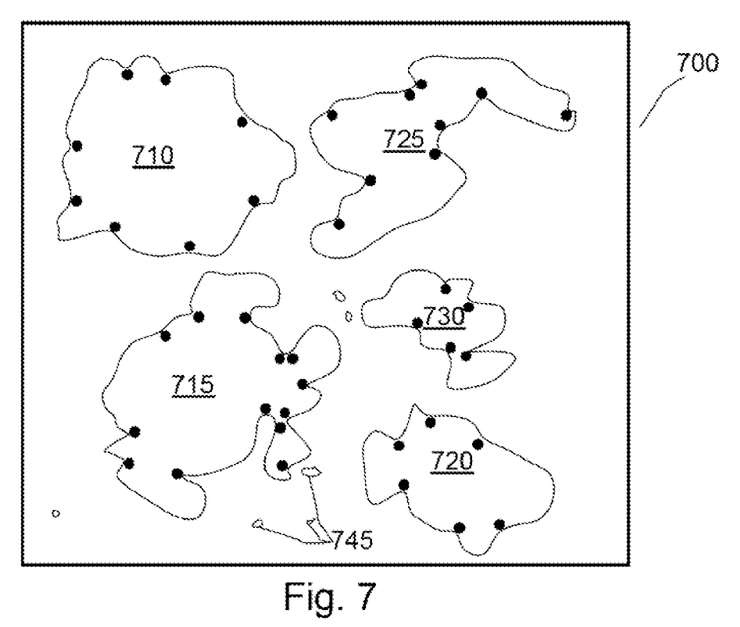
FIG. 7 illustrates the image of FIG. 6 after locating local minima in each of the agglomerates, according to one exemplary embodiment.
Figure 10A:
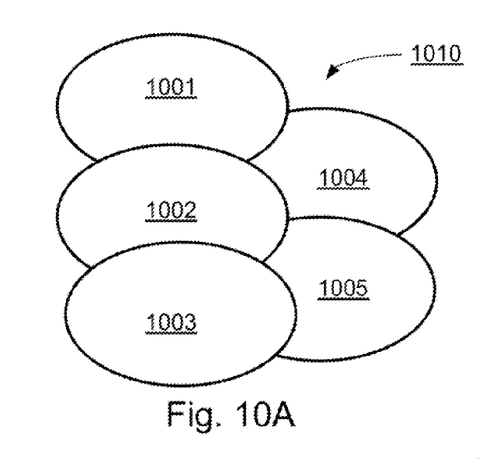
FIGS. 10A-10C illustrate steps for estimating perimeters of individual particles within an agglomerate, according to one exemplary embodiment.

According to one embodiment, once the boundary of an agglomerate is clearly defined, the locations of local minima on the perimeter of the agglomerate may be determined. FIG. 7 illustrates the local minima of each of the agglomerates of the image 700 marked with a black dot. According to one embodiment, for each local minimum found on the perimeter of an agglomerate, a radius of curvature for the minimum may be calculated. The radius of curvature may be compared to a threshold to determine which of the local minima are bifurcations. According to alternative embodiments, such as the embodiment discussed in connection with FIG. 10, shadows cast from one particle of an agglomerate onto another particle of the agglomerate may also be used together with a variety of other techniques to determine the locations of bifurcations.

Figure 8:
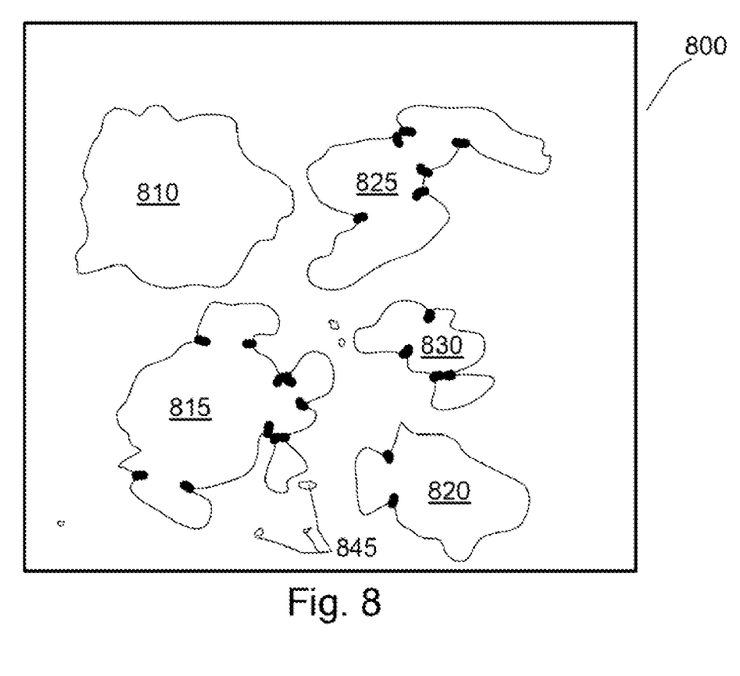
FIG. 8 illustrates the image of FIG. 7 with several bifurcations marked on the image, according to one exemplary embodiment.

As is illustrated by comparing FIG. 7 with FIG. 8, not all local minima represent a bifurcation. FIG. 7 illustrates over forty local minima. However, as is illustrated in FIG. 8, after calculating the radius of curvature of each of the local minima and/or other techniques, the bifurcation detection module determined that only twenty-two of the local minima are bifurcations. The other minima may represent irregularities in the perimeter of various particles. The bifurcations are illustrated in FIG. 8 as thick lines within the perimeters of the agglomerates.

Figure 9:
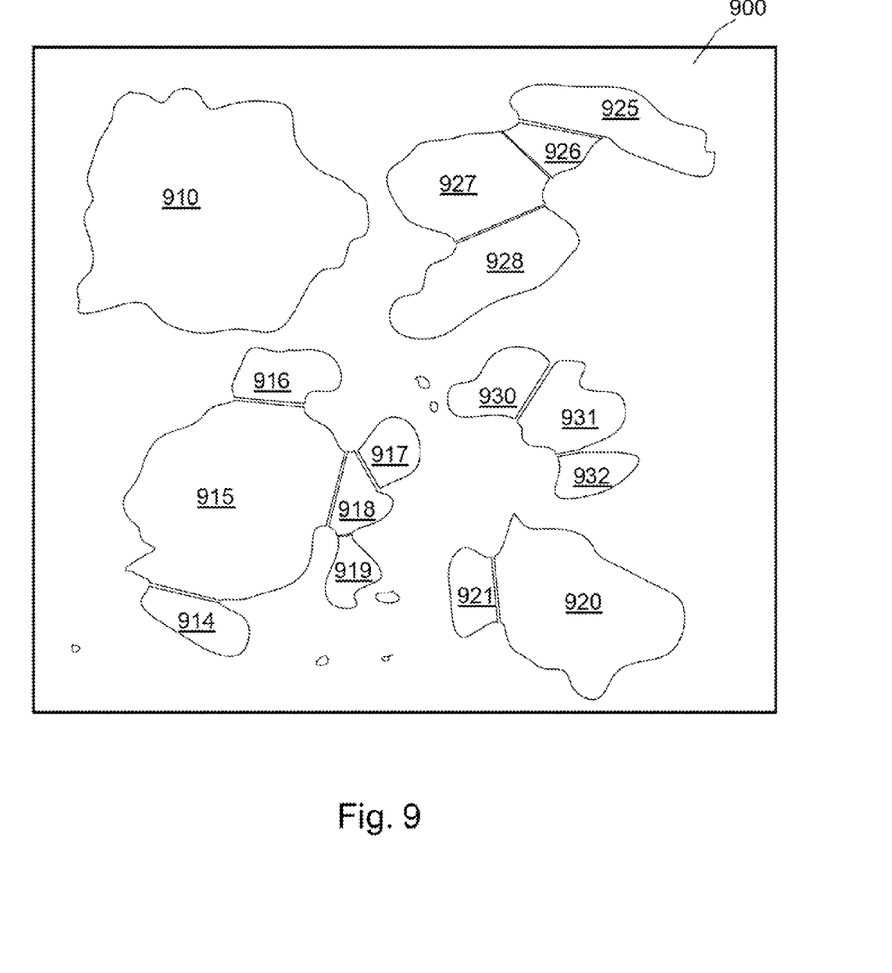
FIG. 9 illustrates an image with estimated perimeters for several particles within agglomerates, according to one exemplary embodiment.

As illustrated in FIG. 9, the perimeter of one or more particles within an agglomerate may be estimated. The estimated perimeters may include straight lines drawn from one bifurcation to another. Alternatively, an estimate of a portion of a perimeter between two bifurcations may be based on the curvature of other portions of the estimated perimeter. As illustrated, particle 910 is not an agglomerate. Particles 925, 926, 927, and 928 form one agglomerate. Particles 930, 931, and 932 form another agglomerate. Particles 920 and 921 form an agglomerate, and particles 914, 915, 916, 917, 918, and 919 form a fourth agglomerate.

According to some embodiments, a shadow cast by one particle onto another may be used to determine the relative vertical positions of agglomerated particles. A system may determine a relative height of a particle as compared to another particle using the location of the bifurcation and the angle of a light source used to capture the image relative to the planar surface the image represents.

Figure 10B:
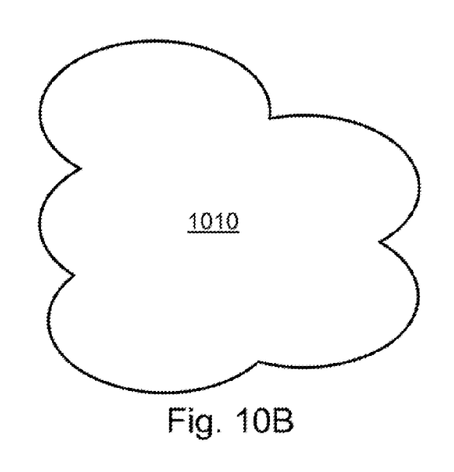
Figure 10C:
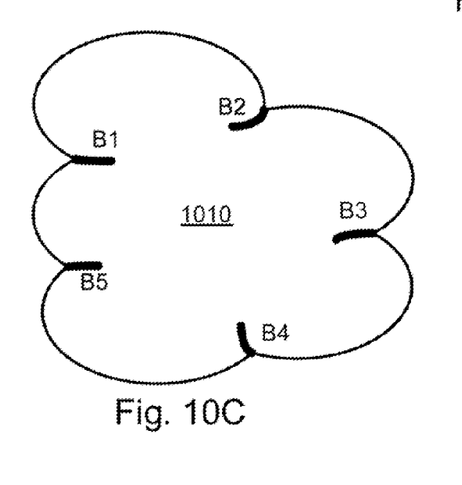

FIGS. 10A-10C illustrate a method of characterizing and analyzing an agglomerate 1010 using shadows cast by one-particle onto another particle. FIG. 10A illustrates agglomerate 1010, in which multiple particles 1001-1005 overlap one another. FIG. 10B illustrates an outer perimeter for the agglomerate 1010, which according to one embodiment is determined by generating a black and white representation of agglomerate 1010.

FIG. 10C illustrates bifurcations B1-B5 in the perimeter of agglomerate 1010. Using only the information in FIG. 10C, it may be difficult to determine the perimeters of each individual particle or even the number of particles within the agglomerate because there is only one bifurcation on the perimeter of agglomerate 1010 for each individual particle in the agglomerate. Shadows may provide additional information that aids in the identification of each particle. For example, as illustrated in FIG. 10A, particle 1002 overlays particle 1005, which in turn overlays particle 1004. Accordingly, particle 1002 may cast a shadow on particles 1005 and/or 1004. Similarly, particle 1005 may cast a shadow on particle 1004. In this way, a system may determine that bifurcations B1 and B5 correspond to particle 1002, and that bifurcation B3 is the intersection between particles 1004 and 1005. Using information from shadows, a system may more accurately determine the number of particles and the perimeters of particles within an agglomerate.

In another embodiment, differences in color, texture, measured composition, or other characteristics between various particles, may also be utilized to more accurately determine the number of particles and the perimeters of particles within an agglomerate. These examples illustrate that multiple representations of an agglomerate (e.g. the representation in FIG. 10A to determine shadows and/or color and the representation in FIG. 10B to determine a perimeter) may be useful in the analysis of an agglomerate. Information may be obtained from each representation to refine estimates of the number of particles in an agglomerate and the perimeters of individual particles within the agglomerate. In an alternative embodiment, the particles may be classified as having a given color by specifying a range of hues for each color from minimum to maximum. If the hue as determined, for example by the technique of averaging a predetermined number of pixels around the center of a particle (e.g., 9 pixels or 25 pixels) falls into a given hue range, the particle may be represented as being of that color. The transition from one color to another may provide information that may be included into an estimation of a perimeter of a particle.

Figure 11A:
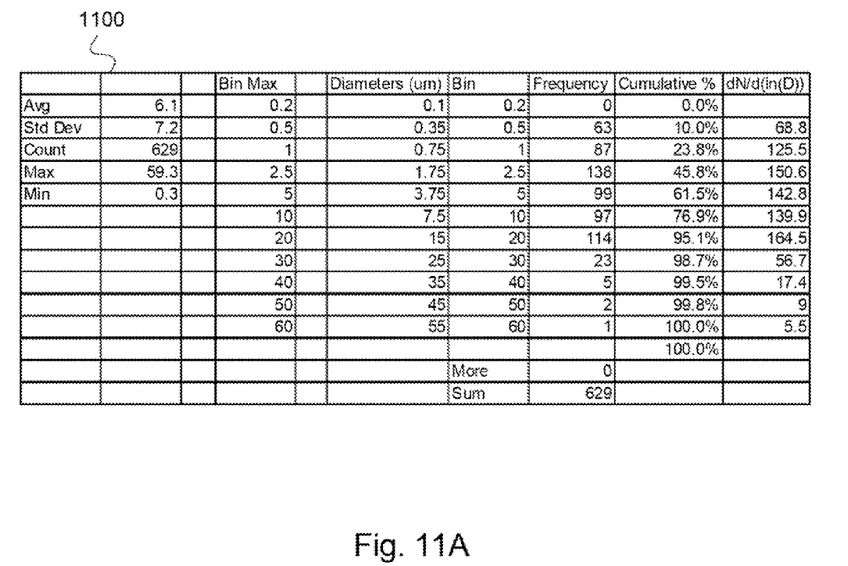
FIGS. 11A & 11B illustrate exemplary statistical and graphical reports of the size distribution of a collection of particles, including agglomerates.
Figure 11B:
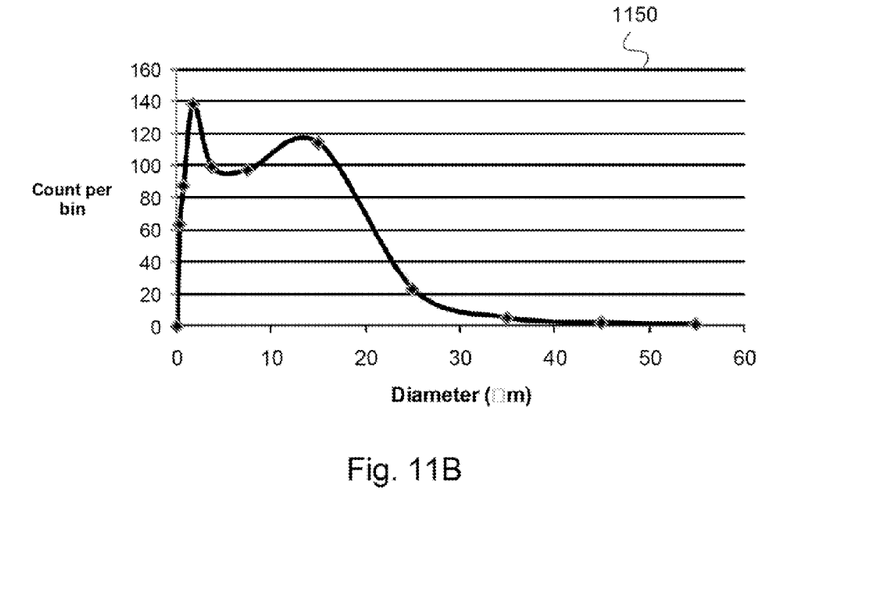

A report of the characteristics of the particle may be generated. As previously described, various characteristics may be analyzed and be used to generate graphical or statistical reports. FIG. 11A illustrates and exemplary statistical report 1100 after an analysis. The report 1100 includes an average, standard deviations, maximum size, minimum size, and a total particle count. As illustrated the report also includes a detailed section on various bins of particles based on size. According to some embodiments, the report may further comprise a graphical report, as illustrate in FIG. 11B. A graph 1150 includes a total count (based on "bins" corresponding to particle sizes) along the y-axis and the particle sizes along the x-axis. The graph 1150 illustrates the number of particles of each size relative to other particles in the sample. According to alternative embodiments, various reports and/or graphs may be generated to illustrate the various characteristics of particles within a given sample.

Thus, an automated system and method for determining and reporting on the characteristics of particles in an agglomerate is provided. The steps of the various processes may be performed in any order and combined to provide a more accurate estimation of particle characteristics. For example, it may be useful to estimate particle characteristics using color (e.g. RGB or HSV) representations and then estimate similar characteristics using bifurcation detection through leaf and node analysis. By combining or averaging estimations it may be possible to obtain more accurate results.

It will be understood by those having skill in the art that many changes may be made to the details of the above-described embodiments without departing from the underlying principles of the disclosure.

The invention claimed is:

1. A computer-implemented method for identifying a plurality of objects in an image, the image including at least one agglomerate comprising a first object and a second object, the method comprising: a computer system identifying a plurality of objects in an image; the computer system determining a boundary of an identified object; the computer system analyzing the boundary of the identified object to detect a first bifurcation and a second bifurcation, wherein each bifurcation is an intersection of a perimeter of a first object and a perimeter of a second object; the computer system determining that the identified object comprises an agglomerate; the computer system determining an orientation of each of the first bifurcation and the second bifurcation; and the computer system estimating a perimeter of each of the first object and the second object using the orientation of the first bifurcation and the orientation of the second bifurcation; the computer system approximating the first object as a first polygon; the computer system approximating the second object as a second polygon; the computer system assigning an integer representation to each side of each of the first polygon and the second polygon; and the computer system representing the orientation of the first bifurcation as a first integer and a second integer, the first integer corresponding to the integer representation of a location on the first polygon of the first bifurcation, and the second integer corresponding to the integer representation of a location on the second polygon of the first bifurcation.

2. The computer-implemented method of claim 1, wherein analyzing the boundary of the identified object to detect a first bifurcation and a second bifurcation comprises: the computer system determining a local minimum on the perimeter of the agglomerate using scan lines; the computer system determining a radius of curvature for the local minimum; and the computer system classifying the local minimum as a bifurcation when the radius of curvature is less than a threshold radius of curvature.

3. The computer-implemented method of claim 2, wherein determining an orientation of the first bifurcation and the second bifurcation comprises: the computer system calculating a first relative orientation of the boundary of the agglomerate to a first side of the local minimum and a second relative orientation of a portion of the boundary of the agglomerate to a second side of the local minimum; and the computer system adjusting the estimate of the perimeter of each of the first object and the second object to accommodate the first relative orientation and the second relative orientation.

4. The computer-implemented method of claim 1, wherein at least one of the first polygon and the second polygon comprises an octagon.

5. The computer-implemented method of claim 1, further comprising the computer system determining an estimated center, an estimated height, and an estimated width of each of the first object and the second object.

6. The computer-implemented method of claim 1, further comprising the computer system calculating an estimated characteristic for each of the plurality of objects, the estimated characteristic selected from the group consisting of a size value, a shape value, a Stokes diameter value, an aerodynamic diameter value, a convexity value, and a circularity value.

7. The computer-implemented method of claim 6, further comprising, the computer system generating a representation of a frequency of objects having a specified estimated characteristic corresponding to at least one specified criteria.

8. The computer-implemented method of claim 7, wherein the representation comprises a histogram representing the relative frequency of objects having the specified estimated characteristic over a range of specified criteria.

9. The computer-implemented method of claim 1, wherein estimating a perimeter of each of the first object and the second object further comprises: the computer system identifying an edge corresponding to a visual characteristic of the first object that differs from the second object; and the computer system adjusting the estimate of the perimeter of each of the first object and the second object to accommodate the edge.

10. The computer-implemented method of claim 9, wherein the visual characteristic is selected from the group consisting of a color, a texture, and a convexity.

11. The computer-implemented method of claim 1, wherein estimating a perimeter of each of the first object and the second object further comprises: the computer system identifying a shadow cast from the first object onto the second object; the computer system determining that the first object overlays the second object; and the computer system adjusting the estimate of the perimeter of each of the first object and the second object to accommodate the determination that the first object overlays the second object.

12. The computer-implemented method of claim 1, wherein identifying a plurality of objects within the image further comprises: the computer system converting the image to a Hue, Saturation, and Value (HSV) representation, including a value plane; the computer system analyzing the value plane of the HSV representation to identify a transition between a background and an object; and the computer system identifying an object in the image using the identified transition.

13. The computer-implemented method of claim 1, wherein determining that the identified object is an agglomerate further comprises: the computer system calculating a circularity value of the identified object; the computer system comparing the circularity value to a threshold value; and the computer system determining that the identified object comprises an agglomerate when the circularity value of the identified object is less than the threshold value.

14. The computer-implemented method of claim 1, further comprising: the computer system determining an estimated center of each of the plurality of objects in the image; the computer system converting the image to a Hue, Saturation, and Value (HSV) representation, including a value plane; the computer system calculating an average hue of a predetermined number of pixels surrounding the estimated center of each of the plurality of objects in the image; and the computer system generating a representation of a frequency of objects within the image with a specified average hue.

15. A computer system to identify a plurality of objects in an image, the image including at least one agglomerate comprising a first object and a second object, the computer system comprising: a processor; a computer readable storage medium in communication with the processor, the computer readable storage medium comprising: an object identification module executable on the processor, the object identification module configured to identify a plurality of objects in an image; a boundary detection module executable on the processor, the boundary detection module configured to detect a boundary of an identified object; an agglomerate identification module executable on the processor, the agglomerate identification module configured to determine that an identified object comprises an agglomerate; a bifurcation detection module executable on the processor, the bifurcation detection module configured to detect a first bifurcation on the boundary of the agglomerate and a second bifurcation on the boundary of the agglomerate, wherein each bifurcation is an intersection of a perimeter of a first object with a perimeter of a second object; an orientation detection module executable on the processor, the orientation detection module configured to detect an orientation of the first bifurcation; and a perimeter estimation module executable on the processor, the perimeter estimation module configured to estimate the perimeter of the first particle using the first bifurcation and the second bifurcation; wherein the orientation detection module is further configured to approximate the first object as first polygon and to approximate the second object as second polygon, to assign each side of each of the first polygon and the second polygon an integer representation, and to assign the orientation of the first bifurcation as a first integer and a second integer, the first integer corresponding to the integer representation of a location on the first polygon of the first bifurcation, and the second integer corresponding to the integer representation of a location on the second polygon of the first bifurcation.

16. The system of claim 15, wherein the bifurcation detection module is further configured to determine a local minimum on the perimeter of the agglomerate, to determine a radius of curvature for the local minimum, and to classify the local minimum as a bifurcation when the radius of curvature is less than a threshold radius of curvature.

17. The system of claim 16, wherein the orientation detection module is further configured to calculate a relative orientation of the perimeter of the agglomerate to a first side of the local minimum and a second relative orientation of a portion of the perimeter of the agglomerate to a second side of the local minimum.

18. The system of claim 15, wherein at least one of the first polygon and the second polygon comprises an octagon.

19. The system of claim 15, further comprising a characterization module executable on the processor, the characterization module configured to determine an estimated center, an estimated height, and an estimated width of each of the first object and the second object.

20. The system of claim 15, further comprising a characterization module executable on the processor, the characterization module configured to determine an estimated characteristic for each of the plurality of objects, the estimated characteristic selected from the group consisting of a size value, a shape value, a Stokes diameter value, an aerodynamic diameter value, a convexity value, and a circularity value.

21. The system of claim 20, further comprising a representation module executable on the processor, the representation module configured to generating a representation of a frequency of objects having a specified estimated characteristic corresponding to at least one specified criteria.

22. The system of claim 21, wherein the representation comprises a histogram representing the relative frequency of objects having the specified estimated characteristic over a range of specified criteria.

23. The system of claim 15, wherein the perimeter estimation module is further configured to identify an edge corresponding to a visual characteristic of the first object that differs from the second object; and wherein the perimeter estimation module is further configured to accommodate the edge, the orientation of the first bifurcation, and the orientation of the second bifurcation.

24. The system of claim 23, wherein the visual characteristic is selected from the group consisting of a color, a texture, and a convexity.

25. The system of claim 15, wherein the perimeter estimation module is further configured to identify a shadow cast from the first object onto the second object, to determine that the first object overlays the second object, and to adjust the estimate of the perimeter of each of the first object and the second object to accommodate the determination that the first object overlays the second object.

26. The system of claim 15, wherein the object identification module is further configured to convert the image to a Hue, Saturation, and Value (HSV) representation, including a value plane; to analyze the value plane of the HSV representation to identify a transition between a background and an object; and to identify the plurality of objects in the image using the identified transition.

27. The system of claim 15, wherein the agglomerate identification module is further configured to calculate a circularity value of the identified object, to compare the circularity value to a threshold value; and to determine that the identified object comprises an agglomerate when the circularity value of the identified object is less than the threshold value.

28. The system of claim 15, wherein the characterization module is further configured to determine an estimated center of each of the plurality of objects in the image; to convert the image to a Hue, Saturation, and Value (HSV) representation, including a value plane; to calculate an average hue of a predetermined number of pixels surrounding the estimated center of each of the plurality of objects in the image; and to generate a representation of a frequency of objects within the image within a specified average hue.

29. A computer system for identifying a plurality of objects in an image, the image including at least one agglomerate, the computer system comprising: means for identifying a plurality of objects in an image; means for determining a boundary of an identified object; means for determining that the identified object comprises an agglomerate; means for analyzing the boundary of the identified object to detect a first bifurcation on the boundary of the agglomerate and a second bifurcation on the perimeter of the agglomerate, wherein each bifurcation is an intersection of a perimeter of a first object and a perimeter of a second object; means for determining an orientation of each of the first bifurcation and the second bifurcation; means for estimating a perimeter of each of the first object and the second object using the orientation of the first bifurcation and the orientation of the second bifurcation; means for approximating the first object as first polygon and to approximate the second object as second polygon, to assign each side of each of the first polygon and the second polygon an integer representation, and to assign the orientation of the first bifurcation as a first integer and a second integer, the first integer corresponding to the integer representation of a location on the first polygon of the first bifurcation, and the second integer corresponding to the integer representation of a location on the second polygon of the first bifurcation.

* * * * *